United States Patent [19]

Byrn

[11] Patent Number: 5,813,125
[45] Date of Patent: Sep. 29, 1998

[54] SELF HOLDING LEVELING SQUARE

[76] Inventor: John Byrn, 771 Cotton Bay Dr., East #2812, West Palm Beach, Fla. 33406

[21] Appl. No.: 703,538
[22] Filed: Aug. 27, 1996
[51] Int. Cl.[6] .............................. B43L 7/027; G01C 9/00
[52] U.S. Cl. ................................ 33/451; 33/371; 33/354; 33/474
[58] Field of Search ........................... 33/451, 333, 334, 33/347, 354, 370, 371, 376, 429, 474, 481

[56] References Cited

U.S. PATENT DOCUMENTS

| 686,240 | 11/1901 | Whitehill | 33/474 |
|---|---|---|---|
| 733,570 | 7/1903 | Victor | 33/451 |
| 1,267,484 | 4/1918 | Bridgman | 33/371 |
| 1,620,469 | 3/1927 | Kirkhoff | 33/376 |
| 1,787,807 | 1/1931 | White | 33/370 |
| 1,963,805 | 6/1934 | Radke et al. | 33/376 |
| 2,058,330 | 10/1936 | Little | 33/474 |
| 2,553,668 | 5/1951 | Morello | 33/347 |
| 3,456,353 | 7/1969 | Iams . | |

Primary Examiner—Christopher W. Fulton
Attorney, Agent, or Firm—John C. Smith

[57] ABSTRACT

A hands free square and level which includes a self holding square that has central channels formed by opposing inner and outer walls. The central channels include mounting holes in its outer wall to allow it to be mounted on a work piece via screws. An inner wall, opposing the outer wall, has corresponding screw driver apertures to allow access to the screws by a screwdriver. The central channel also has transverse bolt apertures which allow the square to be face mounted on a work surface by inserting a bolt through a transverse bolt aperture and then into a work surface. A separate detachable level is sized to slidably fit within a central channel. Hands free operation is achieved by attaching the self holding square to a work surface and then inserting the level into a central channel. An alternative embodiment uses one or more levels which are integrally mounted on the square.

20 Claims, 10 Drawing Sheets

SELF HOLDING LEVELING SQUARE

BACKGROUND OF THE INVENTION

1. Technical Field

The present invention relates to leveling and squaring devices used in the construction and carpentry fields. In particular, it relates to a self holding square with integral levels used to construct door jams, cabinets, house framing, general construction or fabrication, etc. The square is attachable to the work piece such that it can be used hands free.

2. Background Art

The construction tools used in the past have consisted mainly of squares and separate levels to align the angles properly. The square would be used to align the separate materials at a proper angle, and then a separate level would be used.

The square is an old and well known device. The basic square allows the user to align separate materials at a desired angle for construction. Typically, a square comes with a ninety degree angle. In addition to the right angle, the prior art has provided several methods of setting selectable angles. For example, U.S. Pat. No. 3,456,353 to Iams uses a pair of slidable studs to adjust the square angle. The two studs are calibrated and slide along tracks at different angles. By setting the position of the stud at a particular point on a calibrated scale, the angle of the square can be adjusted.

Typically, levels are used as independent devices. When used in conjunction with a square, both of the users hands would be required to hold the two tools. As a result, an additional person would be required to perform the actual construction work while one person is holding the square and level. This not only increases labor costs, but also creates problems in small spaces where two workers may not have sufficient room. Further, inserting an additional instrument may be inconvenient is close areas.

The prior art has also provided a form of square which has a built-in level. For example, U.S. Pat. No. 2,058,330 to Little shows a right angled square with an integral level. This device allows the user to hold the square and the level with a single hand. However, it still requires the user to use one hand while leaving only one hand free to perform other tasks. For many construction tasks, both hands are required to hold the work piece. Therefore, even though both the square and the level can be held with one hand using this device, a second worker would still be required to perform certain tasks.

It would be desirable to have a method of using squares and/or levels which do not require the user to hold them. This would allow a single user to have both hands available for use with the work piece and/or other tools. In many situations, if a user did not have to hold the square or level, then a single user could perform what may have been a two person job. Unfortunately, prior art squares and levels require at least one hand, and sometimes require two hands to use them.

It would also be desirable to have a self holding square which can be attached to a surface at its edge or on its side depending on the nature of the work to be done.

While addressing the basic desirability of using a square and a level, the prior art has failed to provide a self holding square and level which allows hands free use by a worker. The prior art has also failed to provide a method of edge mounting or face mounting the same square and/or level to a work surface.

SUMMARY OF THE INVENTION

The present invention solves the foregoing problems by providing a hands free tool which can be used as both square and level. The device includes a self holding square which has a central channels formed by opposing inner and outer walls. The central channels include mounting holes in its outer wall to allow it to be mounted on a work piece via screws. An inner wall, opposing the outer wall, has corresponding screw driver apertures to allow access to the screws by a screwdriver. The central channels also have transverse bolt apertures which allow the square to be face mounted on a work surface by inserting a bolt through a transverse bolt aperture and then into a work surface. A separate detachable level is sized to slidably fit within a central channel. Hands free operation is achieved by attaching the self holding square to a work surface and then inserting the level into a central channel. An alternative embodiment uses one or more levels which are integrally mounted on the square.

DESCRIPTION OF THE PREFERRED EMBODIMENT

Figure 1:
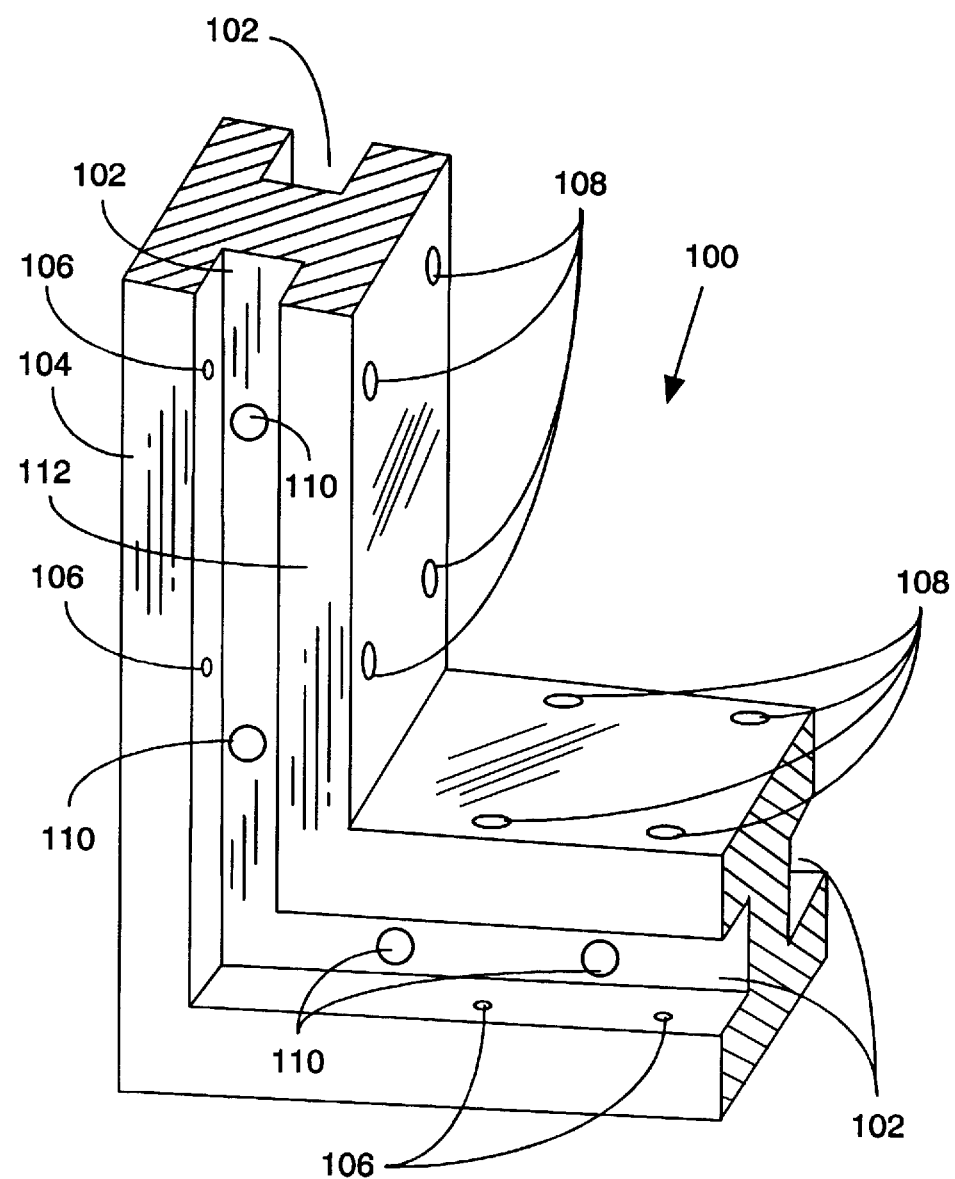
FIG. 1 is a preferred embodiment of the self holding square which illustrates the central channel, the opposing inner and outer walls, the screw apertures, the screw driver apertures, and the transverse bolt apertures.

Referring to FIG. 1, this figure shows a side view of the self holding square 100. The square 100 contains integral channels 102 for the insertion of a level 502 (shown in FIGS. 5 and 6). Central channel 102 is formed by outer wall 104 and inner wall 112. The outer wall 104 has mounting holes 106. Screw driver apertures 108 are aligned with mounting apertures 106 and are sized sufficiently large enough to allow a screw driver shaft to be inserted. When the square 100 is edge mounted to a work piece, a screw is inserted into the mounting aperture 106 and a screw driver is inserted through screw driver aperture 108 to secure the screw.

In addition to edge mounting, the square 100 can also be face mounted (i.e, surface mounted). Transverse bolt holes 110 are located in central channel 102 and are used for face mounting the self holding square 100. Face mounting is discussed more fully below in regard to FIG. 4.

In the preferred embodiment, the square 100 is fabricated from plastic or metal. However, any suitable material can be used. In addition, those skilled in the art will recognize that the size of square 100 and level 502 can vary to suit the particular type of work piece with which they will be used. For example, larger squares 100 may be used for home construction, while smaller squares 100 may be more desirable in more confined areas such as boats or aircraft. For ease of illustration, the figures illustrate a relatively short square 100. However, the length and height of square 100 can be extended to any suitable size.

Figure 2:
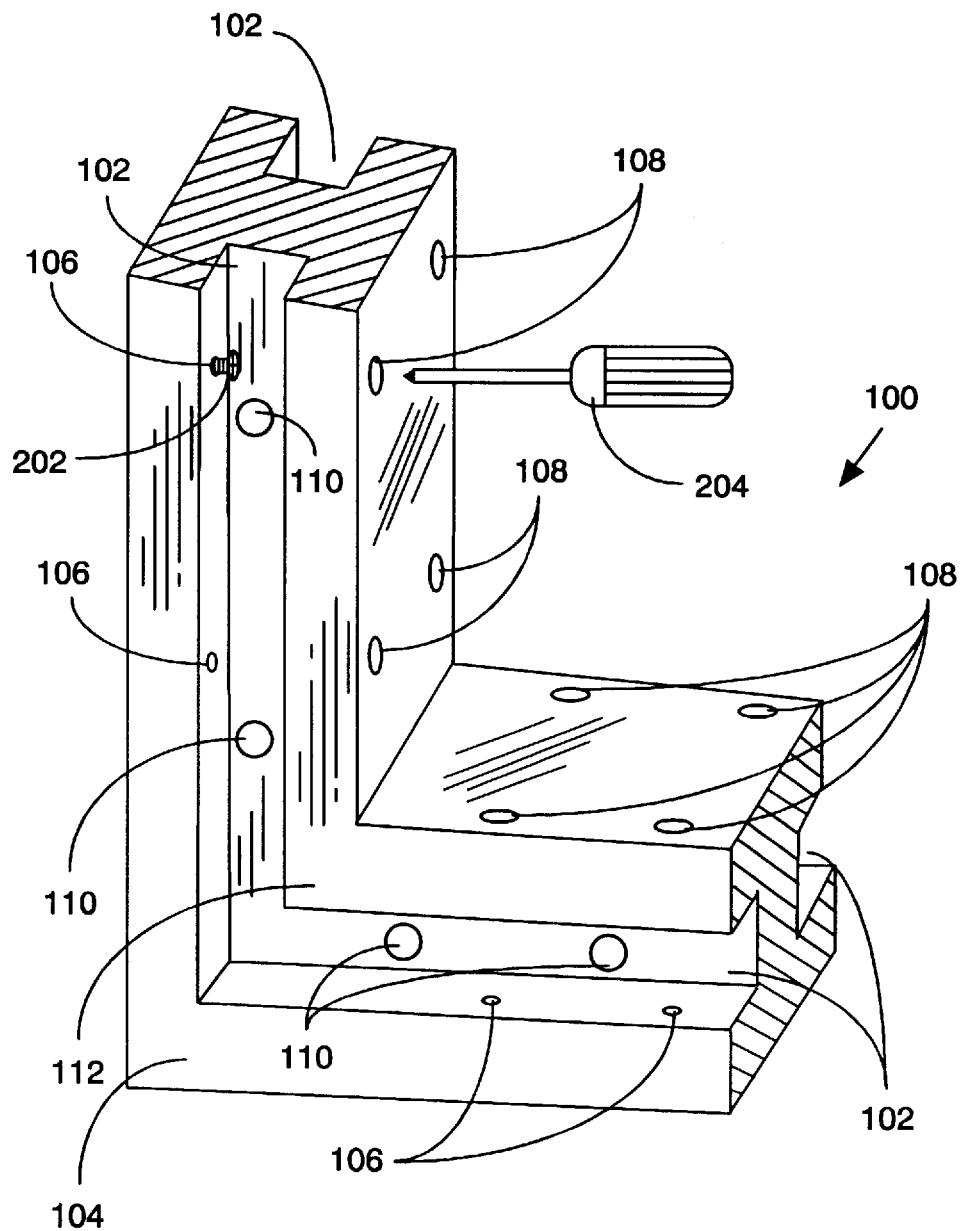
FIG. 2 shows the self holding square with a screw placed at one of the mounting holes and a screwdriver adjacent the screw driver aperture.

In FIG. 2, shows the self holding square 100 with a screw 202 placed in a mounting hold 106. A screwdriver 204 is shown aligned with a screw driver aperture 108. The screw driver aperture 108 is aligned with mounting aperture 106 such that a screw driver 204 inserted through screw driver aperture 108 will have direct access to the screw 202 inserted into opposing mounting aperture 106. Once the screw 202 is in place, the screw driver 204 is used to drive the screw 202 into a work piece 602 (shown below in FIG. 6). The number of screws 202 used to hold a square 100 can vary, depending on the weight and size of the square 100, etc. Those skilled in the art will recognize that as the length of the square 100 increases, the number of mounting apertures 106 will also increase to provide convenience when securing the square 100 to a work piece 602.

Figure 3:
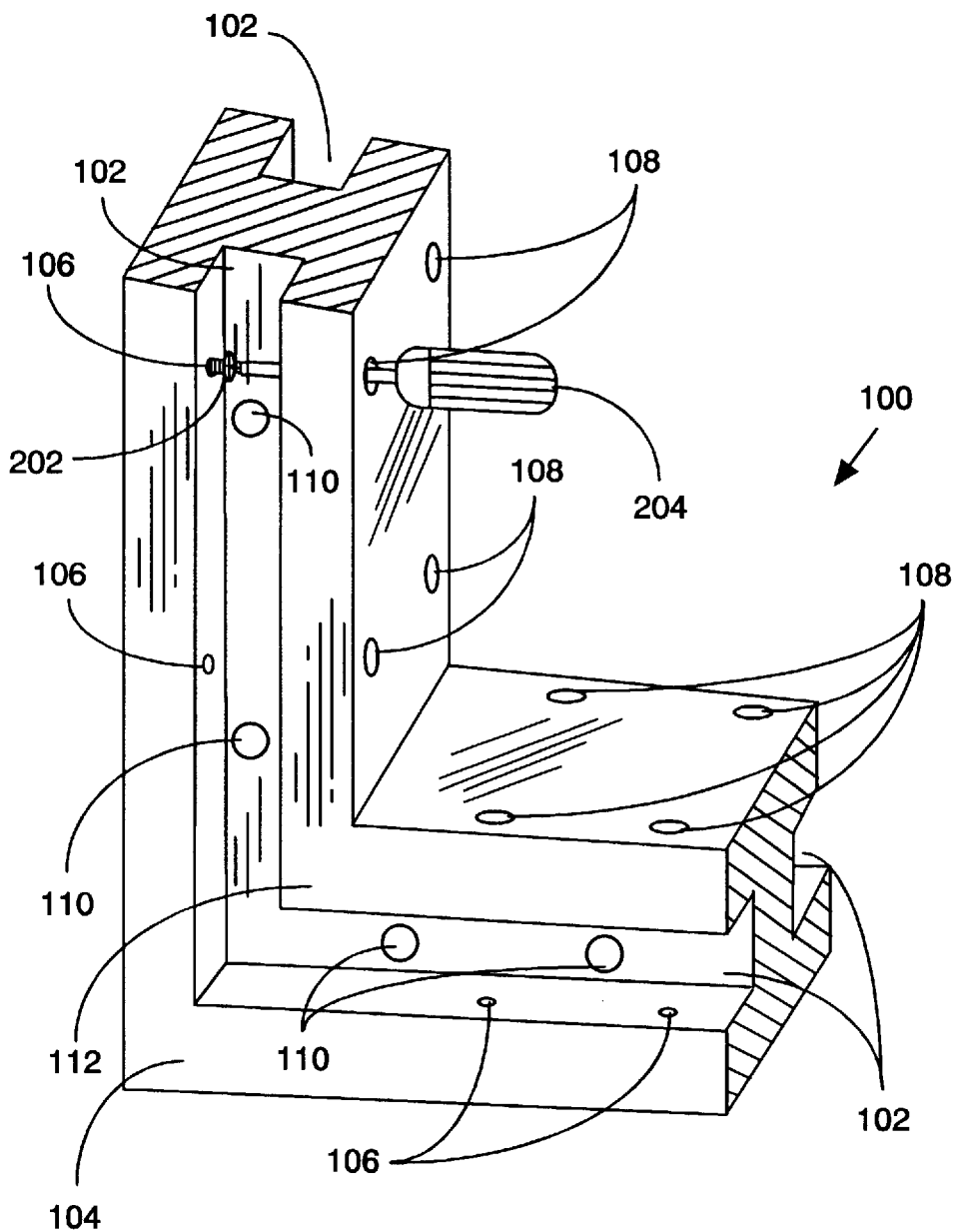
FIG. 3 shows the self holding square with a screw placed at one of the mounting holes and a screwdriver inserted through screw driver aperture.

FIG. 3 illustrates the self holding square 100 with the screw driver 204 inserted through a screw driver aperture 108 and tightening the screw 202 through mounting aperture 106. The advantage of mounting apertures 106 and screw driver apertures 108 is that they provide a method of edge mounting square 100 to a work piece 602. This can be very useful when constructing framing for doors, cabinets, etc. Once the square 100 is attached, the user's hands are freed to attend to other tasks. As a result, the ability to attach the square 100 to a work piece 602 allows the user to be more efficient be allowing hands free use of the square 100. In addition, since the user has both hands available, some tasks which heretofore required two persons can now be performed by a single person. As a result, substantial savings in labor costs can be achieved in some cases by relieving the user of the burden of holding the square 100.

Those skilled in the art will recognize that the location of the mounting apertures 106 and screw driver apertures 108 can be reversed to allow the square 100 to be attached to a surface on the inner wall 112. Likewise, both the inner wall 112 and the outer wall 104 can have alternating mounting apertures 106 and screw driver apertures 108 such that the square 100 can be attached to a work surface on either the outer or inner wall 104, 112.

Figure 4:
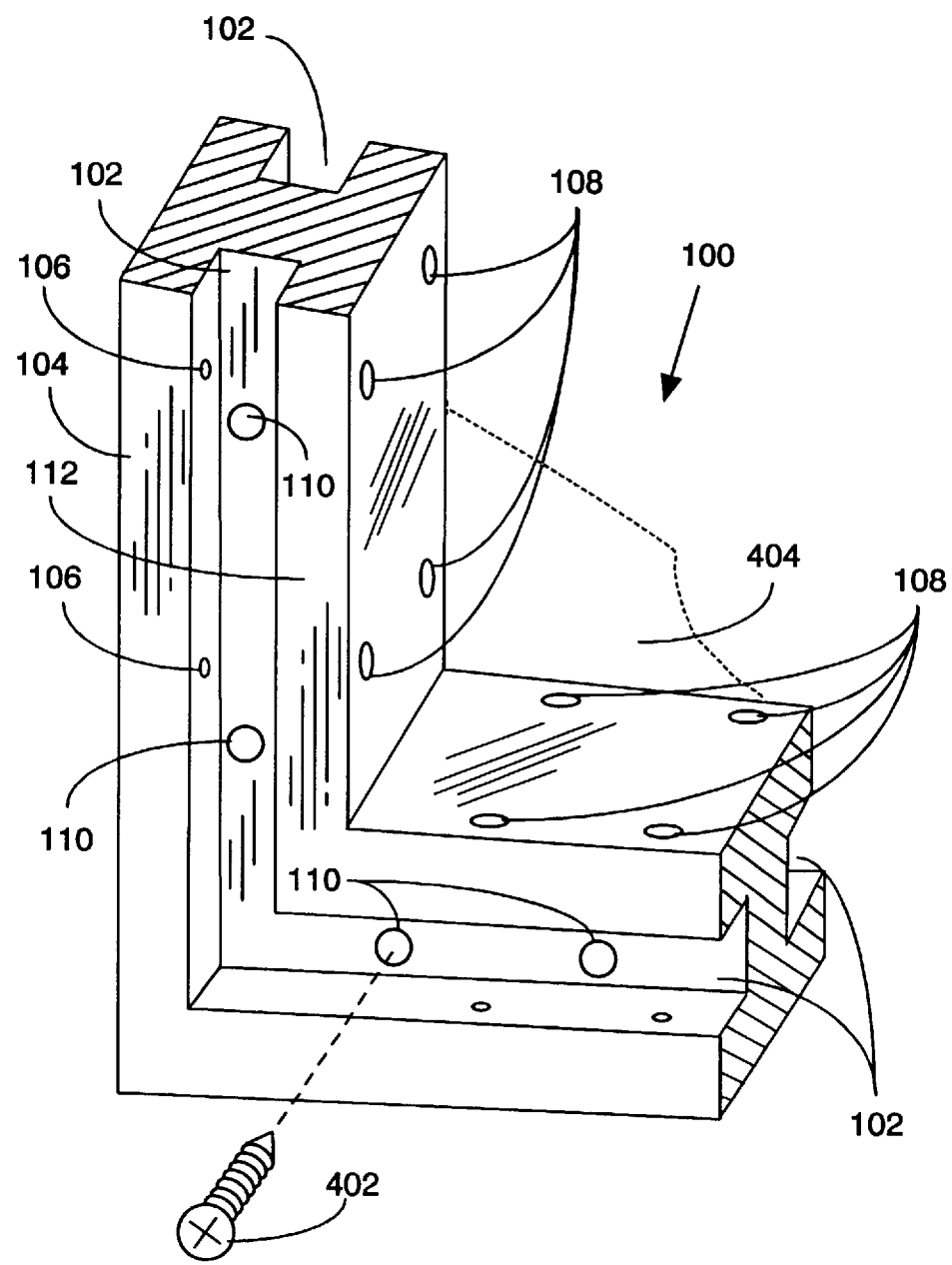
FIG. 4 illustrates a bolt aligned with a transverse bolt aperture for face mounting the square.

FIG. 4 illustrates how the square 100 can be face mounted against a work surface 404 (shown in cutaway view in dashed lines), such as a cabinet wall, the wall of a building, etc. In this figure, square 100 is placed against work surface 404. A bolt 402 is inserted through bolt aperture 110 and driven into work surface 404 to hold square 100 in place. Bolt apertures 110 provide an additional convenience to the user by allowing the square 100 to be face mounted to a work surface 404. As a result of the combination of mounting apertures 106 and bolt apertures 110, square 100 can be attached to a work piece 602 or work surface 404 in a variety of ways. This allows the user to have hands free use of square 100 in many situations.

Figure 5:
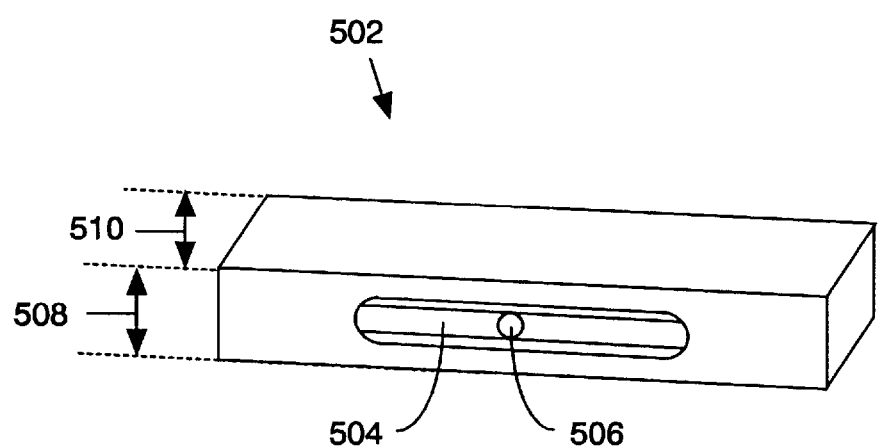
FIG. 5 shows a detachable level.

FIG. 5 shows the slidable level 502 used in conjunction with square 100. Level 502 is shown with a conventional water filled tube 504 with a leveling bubble 506. Of course, any suitable leveling indicator could be used in place of the conventional air bubble level shown in FIG. 5. In the preferred embodiment, the height 508 is set to snugly and slidably fit within central channel 102. Central channel 102 holds level 502 such that it does not have to be held in place by the user during use. Also, in the preferred embodiment the depth 510 of level 502 is larger the depth of central channel 102. The reason for this is that by having a larger depth than the central channel 102, level 502 will protrude slightly from square 100. By protruding from square 100, level 502 will be easier to grasp and be manipulated by the user. Those skilled in the art will recognize that level 502 can also be sized such that it does not protrude from central channel 102.

Figure 6A:
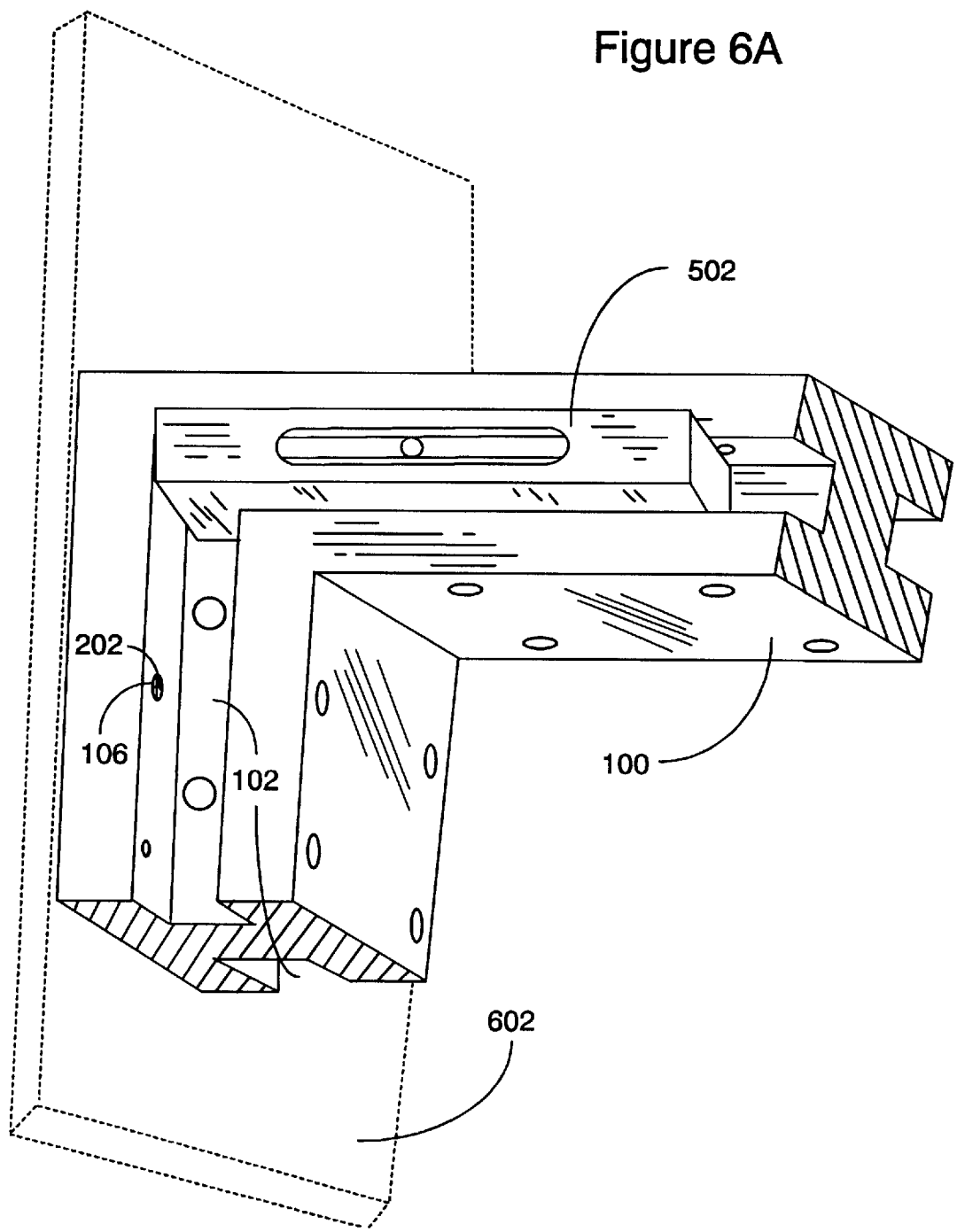
FIG. 6A shows the self holding square attached to a work surface via a screw. A detachable level is shown inserted in the central channel of the self holding square. The level is flush mounted in the square to measure level in a first plane.

FIG. 6A illustrates the self holding square 100 edge mounted to a work piece 602. A screw 202 is driven through mounting aperture 106 and into work piece 602 to hold square 100 in place for hands free use. The level 502 slidably mounted in central channel 102. By securing square 100 and level 502 to the work piece 602 in this manner, the user has both hands free to manipulate and position work piece 602. As discussed above, this may greatly reduce labor costs by eliminating the need for a second person to hold the square 100 and level 502 while work piece 602 is being manipulated.

This figure shows screw 202 inserted into outer wall 104 such that the head of screw 202 is flush with the inner surface of outer wall 104. It is advantageous to position the screw 202 in this manner such that if the screw was located in the same area of central channel 102 as level 502, then it would not interfere with the level 502 when level 502 is being inserted or moved. Also illustrated in this figure is the use of central channels 102 on both sides of square 100. This allows additional flexibility when positioning the square 100.

Figure 6B:
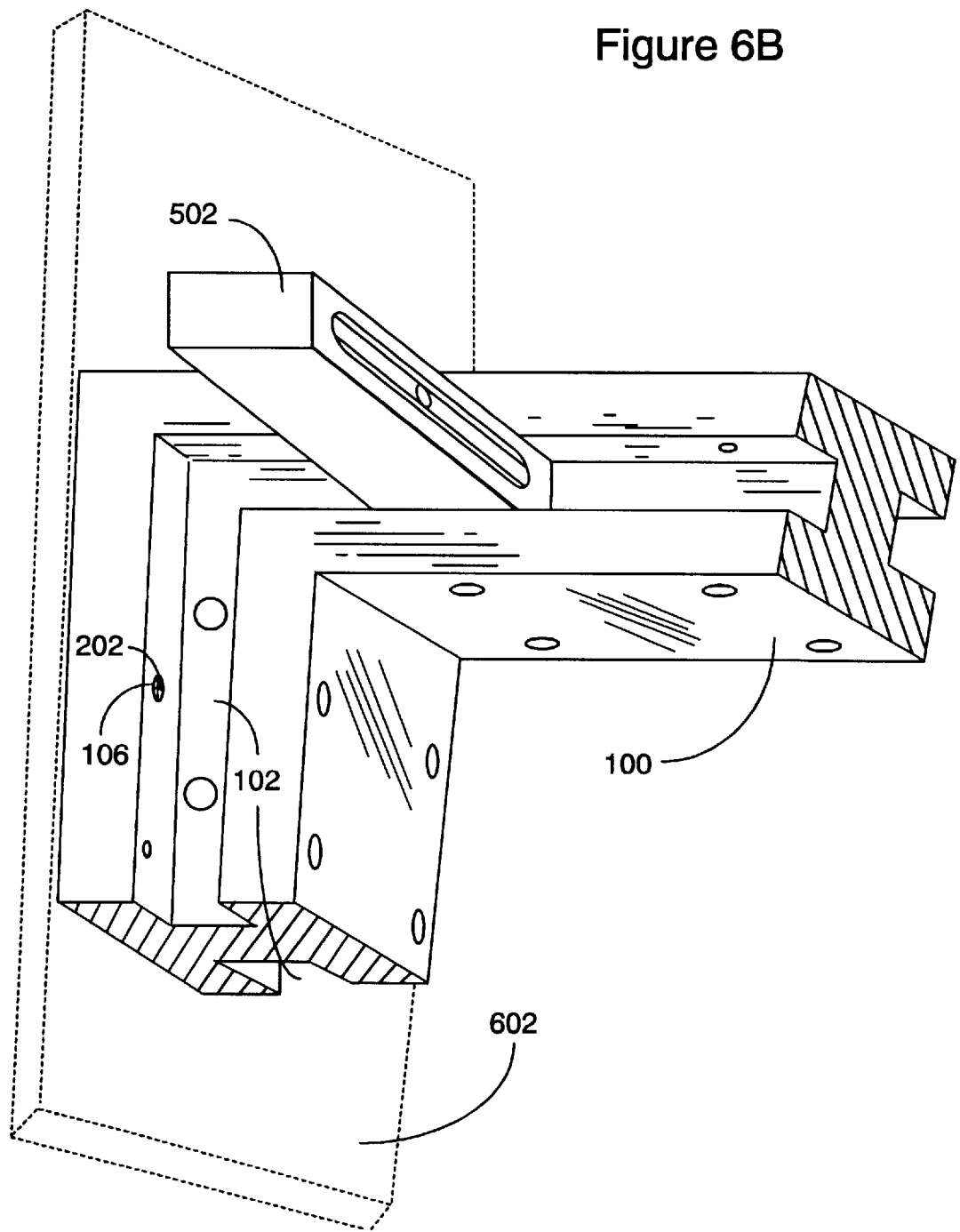
FIG. 6B shows the self holding square attached to a work surface via a screw. A detachable level is shown inserted in the central channel of the self holding square. The level is end mounted in the square to measure level in a second plane.

As shown in FIG. 6B, an advantage of using a detachable level 502 as opposed to permanently integrating level 502 into square 100 is that a detachable level 502 can measure level in more than one plane. While FIG. 6A shows the level of work piece 602 being measured in a first plane, FIG. 6B shows that level 502 can be used to measure the plane of work piece 602 in a second plane as well. By removing level 502 and reinserting it in an end mounted fashion as shown in FIG. 6B, the user can examine the level of a work piece 602 in two planes.

Those skilled in the art will recognize that two levels 502 can be used to measure two planes simultaneously. Likewise, level 502 can be fabricated with a first water filled tube 504 and leveling bubble 506 oriented in a first plane and a second water filled tube 504 and leveling bubble 506 oriented in a second plane. This would allow the user to measure the level of a work piece in multiple planes simultaneously while maintaining hands free status. As a result, the user can more easily manipulate the installation of work piece 602. This provides a particularly valuable convenience for craftsmen installing bulky items, such as kitchen cabinets, which require precise alignment during installation.

Figure 7:
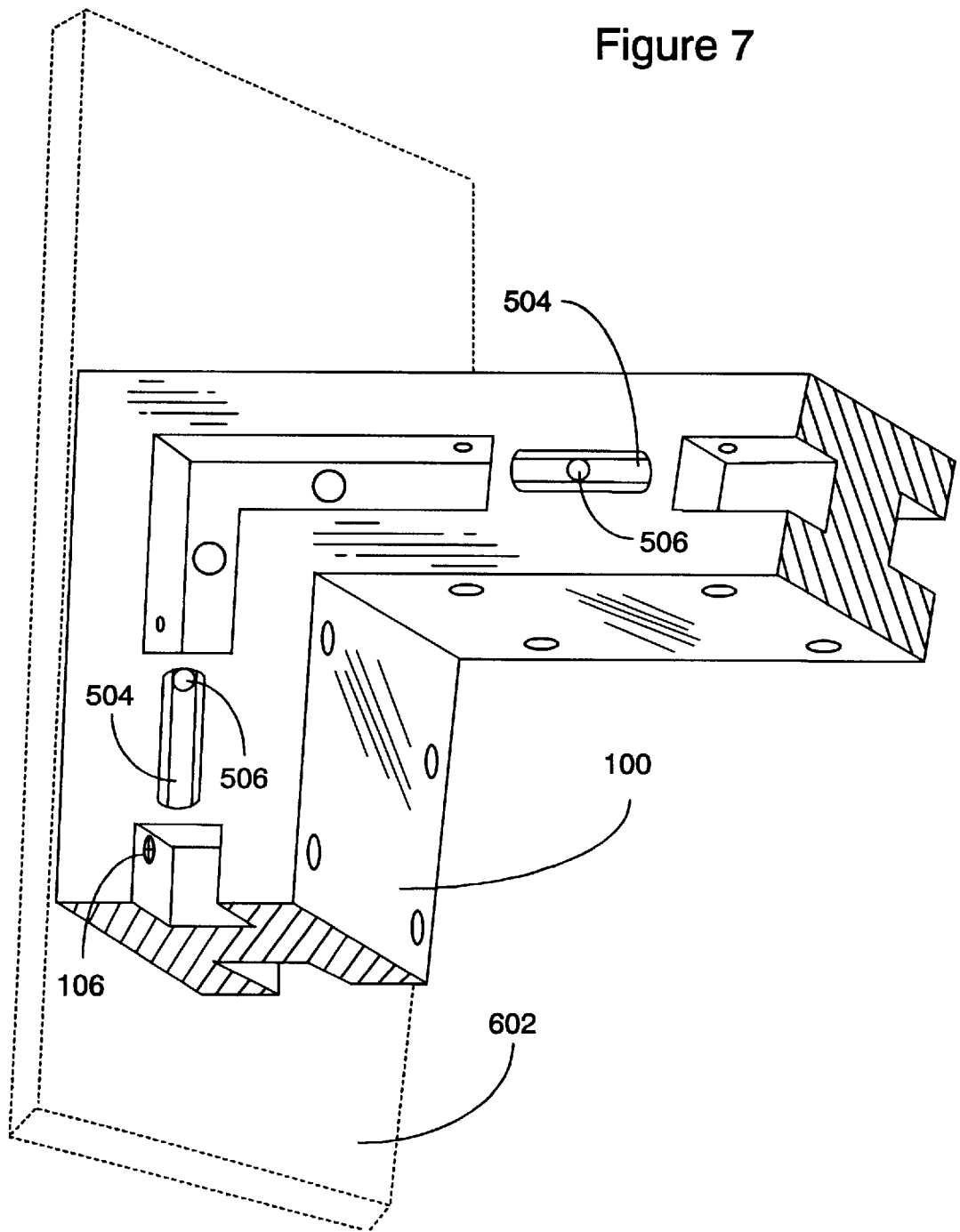
FIG. 7 is an alternative embodiment which integrally mounts the level in the central channel.

FIG. 7 illustrates an alternative embodiment in which levels 504, 506 are integrally formed in the side of square 100. Square 100 is secured to a work piece 602 in the manner as discussed above. A disadvantage of this embodiment is that it can only measure the level of a work piece 602 in a single plane. Further, by integrating levels 504, 506 into square 100, the user can no longer use the level 504, 506 independently of the square 100.

Figure 8:
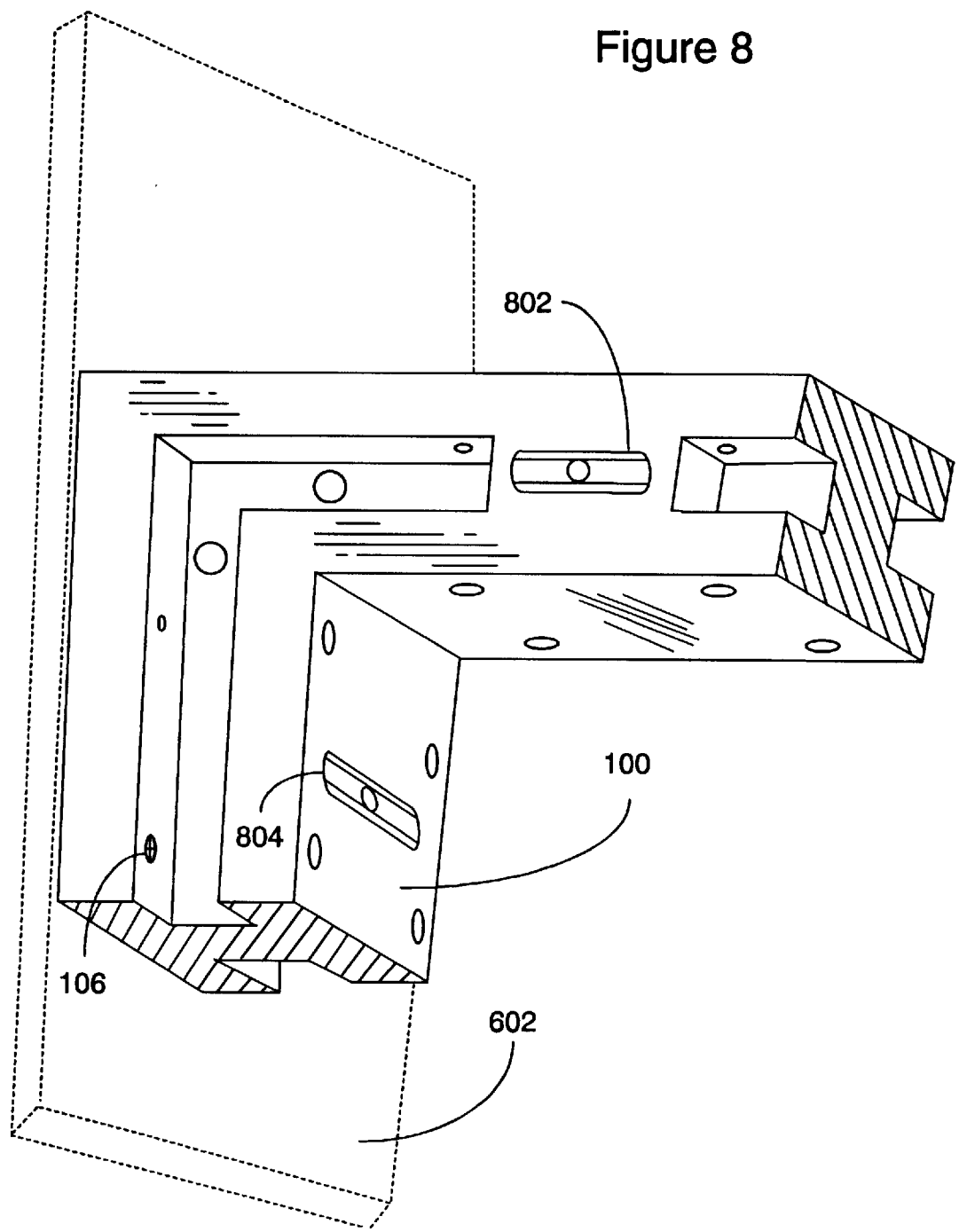
FIG. 8 is another alternative embodiment in which two integrally mounted levels are built into the square. Each level measures a different plane such that a work piece can be oriented in two planes simultaneously.

FIG. 8 illustrates another alternative embodiment in which levels 802, 804 are integrally formed in the side of square 100. Square 100 is secured to a work piece 602 in the manner as discussed above. An advantage of this embodiment is that it can measure the level of a work piece 602 in two planes simultaneously. This method of positioning multiple levels allows the user to attach the square 100 to a work piece such as a cabinet and orient the cabinet for installation to a wall, bulkhead, etc. In installations where multiple cabinets are installed simultaneously, relative positioning is critical and the ability to properly position each cabinet reduces installation time and results in a better product installation.

In addition to the multiple levels 802, 804 shown in this figure, another optional method of arranging the mounting apertures 106 and screw driver apertures 108 is shown. The mounting apertures 106 are alternately located on both the inner and outer walls 104, 112. This arrangement provides the user more freedom when attaching square 100 to a work piece 602 since either wall 104, 112 can be in contact with a given work piece 602.

Figure 9:
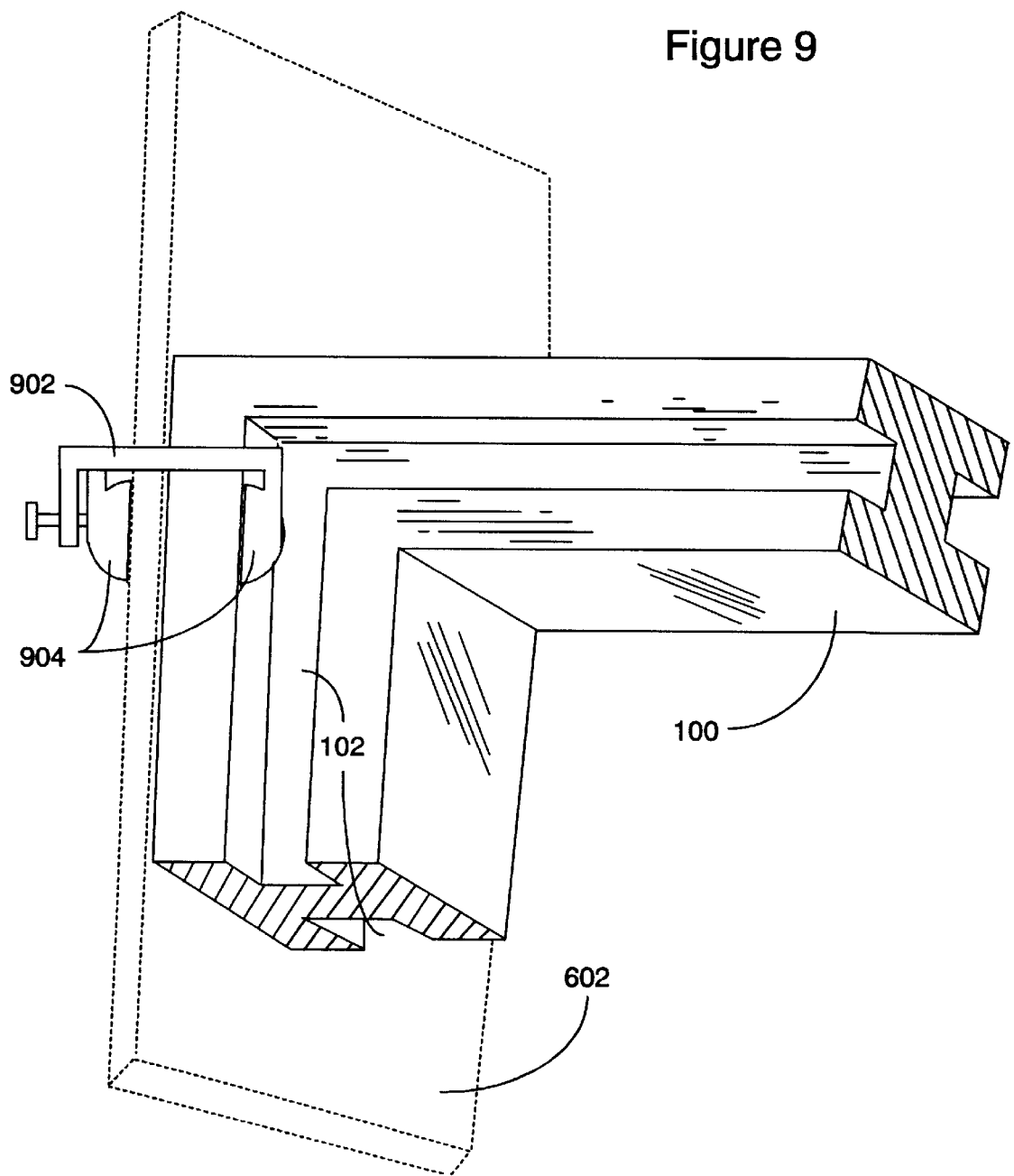
FIG. 9 is another alternative embodiment in which the square is attached to a work piece by a clamp.

FIG. 9 is another alternative embodiment in which the mounting apertures 106 and screw driver apertures 108 are eliminated. This embodiment is held by a C-clamp or pony clamp (hereinafter collectively called C-clamp 902) instead of with screws. C-clamp 902 holds square 100 and work piece 602 together between foot pads 904. C-clamps 902 are well known in the art.

This embodiment is useful of working with materials which may be damaged by screws. It allows the square 100 to be attached to the work piece 602 and then be removed without leaving any visible marks. This is particularly useful for furniture, cabinets, etc, where cosmetic concerns are important. It has an additional advantage in that it can be quickly attached to the work piece 602.

While the invention has been described with respect to a preferred embodiment thereof, it will be understood by those skilled in the art that various changes in detail my be made therein without departing from the spirit, scope, and teaching of the invention. The size and type of materials used to fabricate the self holding square 100 can vary in orientation. The square can be configured as a T-square in addition to the right angle square shown in the figures. Likewise, the type of level can change, etc. Accordingly, the invention herein disclosed is to be limited only as specified in the following claims.

I claim:

1. A self holding square and level for hands free attachment to a work surface, comprising:
    a square, further comprising:
        at least one central channel, the central channel formed by a first wall and a second wall extending outward from the square;
        at least one mounting aperture in the first wall, the mounting aperture having a diameter sufficiently large enough to accept a screw; and
        at least one screw driver aperture in the second wall, the screw driver aperture having a diameter large enough to accept a screw driver shaft and positioned substantially opposite the mounting aperture such that the screw driver can drive a screw in the mounting aperture; and
    a first level, the first level sized such that it slidably and snugly fits within the central channel such that it can be placed and held in a preselected location in the central channel;
    whereby, the square and the first level can temporarily be edge mounted to a work surface for hands free use.

2. A self holding square and level, as in claim 1, wherein:
    both the first and second walls have at least one mounting aperture;
    at least one mounting aperture on each wall has a corresponding screw driver apertures positioned substantially opposite it.

3. A self holding square and level, as in claim 2, further comprising:
    the square further comprises at least one transverse bolt aperture, the transverse bolt aperture having a diameter sized to accept a bolt;
    whereby the square can be face mounted to a work surface by a bolt placed through the transverse bolt aperture.

4. A self holding square and level, as in claim 3, further comprising:
    at least a second central channel formed by a second inner wall and outer wall, the central channels located on opposite surfaces of the square.

5. A self holding square and level, as in claim 4, further comprising:
    at least a second level, the second level sized to snugly and slidably fit in the central channel; and
    the central channel having sufficient space to simultaneously hold the first and second levels such that the each level measures a different plane.

6. A self holding square and level, as in claim 1, further comprising:
    the square further comprises at least one transverse bolt aperture, the transverse bolt aperture having a diameter sized to accept a bolt;
    whereby the square can be face mounted to a work surface by a bolt placed through the transverse bolt aperture.

7. A self holding square and level, as in claim 6, further comprising:
    at least a second central channel formed by a second inner wall and outer wall, the central channels located on opposite surfaces of the square.

8. A self holding square and level, as in claim 7, further comprising:
    at least a second level, the second level sized to snugly and slidably fit in the central channel; and
    the central channel having sufficient space to simultaneously hold the first and second levels such that the each level measures a different plane.

9. A self holding square and level, as in claim 1, further comprising:
    at least a second central channel formed by a second inner wall and outer wall, the central channels located on opposite surfaces of the square.

10. A self holding square and level, as in claim 9, further comprising:
    at least a second level, the second level sized to snugly and slidably fit in the central channel; and
    the central channel having sufficient space to simultaneously hold the first and second levels such that the each level measures a different plane.

11. A self holding square and level for hands free attachment to a work surface, comprising:
    at least one central channel, the central channel formed by a first wall and a second wall extending outward from the square;
    at least one mounting aperture in the first wall, the mounting aperture having a diameter sufficiently large enough to accept a screw; and at least one screw driver aperture in the second wall, the screw driver aperture having a diameter large enough to accept a screw driver shaft and positioned substantially opposite the mounting aperture such that the screw driver can drive a screw in the mounting aperture; and at least one level, the level integrally mounted within the square such that it is not removable.

12. A self holding square and level, as in claim 11, further comprising:

the square further comprises at least one transverse bolt aperture, the transverse bolt aperture having a diameter sized to accept a bolt;

whereby the square can be face mounted to a work surface by a bolt placed through the transverse bolt aperture.

13. A self holding square and level, as in claim 12, wherein:

both the first and second walls have at least one mounting aperture;

at least one mounting aperture on each wall has a corresponding screw driver apertures positioned substantially opposite it.

14. A self holding square and level, as in claim 13, further comprising:

a second level, the second level integrally mounted within the square such that it is not removable; and the first and second levels mounted such that the each level measures a different plane.

15. A method of attaching a self holding square and level to a work surface such that the self holding square and level can be used hands free, including the steps of:

forming a central channel in the self holding square with a first wall and a second wall, each wall extending outward from the square;

locating at least one mounting aperture in the first wall, the mounting aperture having a diameter sufficiently large enough to accept a screw;

locating at least one screw driver aperture in the second wall, the screw driver aperture having a diameter large enough to accept a screw driver shaft and positioned substantially opposite the mounting aperture;

edge mounting the square onto a work surface by driving the screw through the mounting aperture into a work surface with the screw driver; and slidably and snugly fitting a first level within the central channel such that it can be placed and held in a preselected location in the central channel;

whereby, the square and the first level can temporarily be edge mounted to a work surface for hands free use.

16. A method, as in claim 15, including the steps of:

locating at least one transverse bolt aperture in the square; and inserting a bolt through the transverse bolt aperture and into a work surface;

whereby the square can be face mounted to a work surface by a bolt placed through the transverse bolt aperture.

17. A method, as in claim 16, including the steps of:

snugly and slidably fitting a second level into the central channel; and orienting the first and second levels such that the each level measures a different plane.

18. A self holding square and level for hands free attachment to a work surface, comprising:

a square, further comprising:

at least one central channel, the central channel formed by a first wall and a second wall, each wall extending outward from a side surface of the square;

the central channel further having a sufficient size to hold a foot pad of a C-clamp; and a first level, the first level sized such that it slidably and snugly fits within the central channel such that it can be placed and held in a preselected location in the central channel;

whereby, the square and the first level can temporarily be edge mounted to a work surface by a C-clamp for hands free use.

19. A self holding square and level, as in claim 18, further comprising:

at least a second central channel fanned by a second inner wall and outer wall, the central channels located on opposite surfaces of the square.

20. A self holding square and level, as in claim 19, further comprising:

at least a second level, the second level sized to snugly and slidably fit in the central channel; and the central channel having sufficient space to simultaneously hold the first and second levels such that the each level measures a different plane.

* * * * *